United States Patent
Senft et al.

(10) Patent No.: US 7,634,349 B2
(45) Date of Patent: Dec. 15, 2009

(54) PROCESS AND DEVICE FOR PROTECTION OF TEMPERATURE-SENSITIVE COMPONENTS IN THE INTAKE AREA OF AN INTERNAL COMBUSTION ENGINE WITH EXHAUST RECIRCULATION

(75) Inventors: Peter Senft, Amberg (DE); Markus Sonner, Kosching (DE); Michael Kuhn, Gaimersheim (DE)

(73) Assignee: Audi AG, Ingolstadt (DE)

( * ) Notice: Subject to any disclaimer, the term of this patent is extended or adjusted under 35 U.S.C. 154(b) by 567 days.

(21) Appl. No.: 11/331,270

(22) Filed: Jan. 13, 2006

(65) Prior Publication Data

US 2006/0178801 A1 Aug. 10, 2006

(30) Foreign Application Priority Data

Jan. 15, 2005 (DE) ............... 10 2005 001 961

(51) Int. Cl.
*F02D 21/08* (2006.01)
*F02M 25/07* (2006.01)

(52) U.S. Cl. .................. 701/108; 123/568.14

(58) Field of Classification Search ......... 701/108–109; 123/676, 568.14; 60/274, 285; 73/117.3, 73/114.74

See application file for complete search history.

(56) References Cited

U.S. PATENT DOCUMENTS

| 4,462,376 A | * | 7/1984 | Ripper et al. ............... 123/676 |
| 4,793,318 A | * | 12/1988 | Tsurusaki .................. 123/676 |
| 4,967,717 A | * | 11/1990 | Miyazaki et al. ......... 73/114.74 |
| 6,438,947 B2 | * | 8/2002 | Ludwig et al. ................ 60/285 |

FOREIGN PATENT DOCUMENTS

| EP | 897467 | 6/2003 |
| EP | 1548268 | 6/2005 |
| GB | 2324338 | 10/1998 |

* cited by examiner

*Primary Examiner*—Hieu T Vo
(74) *Attorney, Agent, or Firm*—Novak Druce & Quigg LLP

(57) ABSTRACT

A method of diminishing the thermal effects of the exhaust gas recirculation in an internal combustion engine of a motor vehicle generally consisting of sensing the temperature of the gas at a selected point along the flow thereof, comparing the sensed temperature with a selected temperature and adjusting the supply of the gas responsive to a selected deviation of the sensed temperature from the selected temperature.

14 Claims, 1 Drawing Sheet

Figure 1:
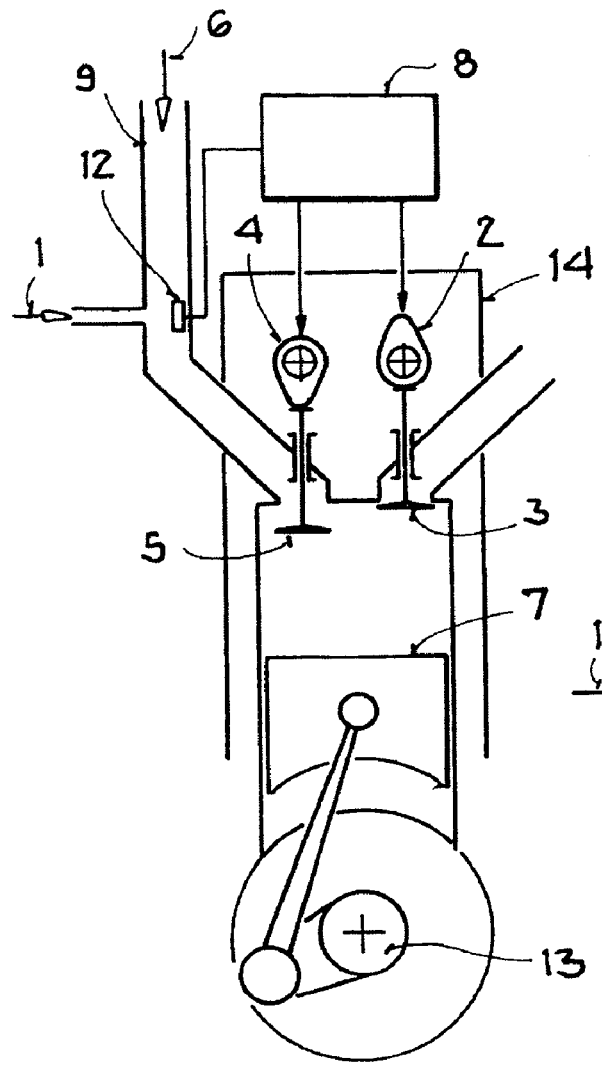

PROCESS AND DEVICE FOR PROTECTION OF TEMPERATURE-SENSITIVE COMPONENTS IN THE INTAKE AREA OF AN INTERNAL COMBUSTION ENGINE WITH EXHAUST RECIRCULATION

This application claims priority from German Application No. 10 2005 001 961.7, filed Jan. 15, 2005, herein incorporated by reference in its entirety.

The invention relates to a process and a device for protection of temperature-sensitive components in the intake area of an internal combustion engine with exhaust recirculation for a motor vehicle.

To reduce fuel consumption and exhaust gas emissions, modern internal combustion engines, both spark-ignition and diesel engines, for use in motor vehicles are equipped with so-called exhaust gas recirculation in which an amount of exhaust gas determined depending on several engine parameters and optionally also vehicle parameters, such as for example the pressure and temperature of the gas mixture of the intake air and recirculated exhaust gas, engine temperature, outside temperature, driving speed, engine speed, engine load, to name only a few examples, is fed into the intake manifold by recirculation.

The amount of recirculated exhaust gas is set by adjusting the inlet and outlet camshaft or the two camshafts which control the inlet and outlet valves. By adjusting the inlet and outlet camshaft the exhaust gas during the discharge stroke is first pushed back into the inlet channel and the intake manifold in order to then be intaken again in the following intake stroke.

Because the intake manifold is supplied with hot exhaust gases, it can be greatly heated. The longer the engine is in operation, the higher the temperature in the intake manifold rises and the hotter it becomes. The materials suitable for the intake manifolds therefore have to be temperature-resistant materials such as metal alloys which are however subject to the disadvantage of a high purchase price and heavy weight.

In order to reduce the cost of manufacturing an internal combustion engine with exhaust gas recirculation, instead of intake manifolds produced from expensive temperature-resistant metal alloys, intake manifolds of economical plastics could be used, but they are not suited for the high temperatures which occur in exhaust gas recirculation in the intake manifold and which entail the danger of overheating of the material. The advantage of low fuel consumption therefore dictates as a disadvantage the use of intake manifolds of expensive materials, for example metal alloys in particular.

DE 102 29 620 A1 describes a process for determining amounts of exhaust gas recirculation for an internal combustion engine with exhaust gas recirculation. The object of this known process is to always reliably and accurately determine, at relatively low cost, exhaust gas recirculation in different operating states of the engine and especially also under varying pressure and temperature conditions of the gas mixture supplied to the engine. In this known process, in a first process step a so-called base amount of the gas mixture which is fed into the combustion chamber is determined for at least one definable base state of the internal combustion engine with the exhaust gas recirculation deactivated. For the respective base state a base temperature or a base pressure is determined. In the following second process step during continuing engine operation the pressure or the temperature of the supplied gas mixture is determined for the respective current operating state of the internal combustion engine with the exhaust gas recirculation activated, in order to determine therefrom in a third process step the currently supplied amount of gas mixture which is ascertained from the base amount corrected from the ratio of the base pressure to the current pressure or the base temperature to the current temperature. Finally, in a fourth process step the amount of exhaust gas recirculation is computed from the difference of the supplied amount of gas mixture and the amount of fresh gas.

The object of the invention is to devise a process and a device which permits use of economical components, especially of the intake manifold, in the intake area of an internal combustion engine with exhaust gas recirculation under optimum operating conditions.

This object is achieved with the application of the process with the features specified in claim 1 in that the temperature is measured at at least one definable point in the intake area and/or that computation of the temperature prevailing at at least one definable point in the intake area is done by means of a computational model and that the amount of recirculated exhaust gas is set such that the measured and/or computed temperature at a definable point does not exceed a definable maximum value.

With regard to the device, this object is achieved with the features specified in claim 8 in that there is a temperature sensor for measuring the temperature at at least one definable point in the intake area and/or an arithmetic unit is provided for computing the temperature prevailing at at least one definable point in the intake area by means of a computational model and that the amount of recirculated exhaust gas is set such that the measured and/or computed temperature does not exceed a definable maximum value.

As claimed in the invention, the amount of recirculated exhaust gas is set such that on the one hand the lowest possible fuel consumption is achieved, on the other however that the boundary temperature at a definable point in the intake area, preferably where the highest temperature occurs, is under no circumstances exceeded. By this measure as claimed in the invention the maximum possible reduction of fuel consumption possible for the temperature prevailing at a respective definable point is achieved. Only if the definable maximum value of the temperature at this point in the intake area is reached is the exhaust gas recirculation choked and limited to such an extent that the temperature at a definable point does not exceed a definable maximum value. Preferably the amount of recirculated exhaust gases is set such that the temperature at the definable point is adjusted to a definable maximum value.

Instead of measuring the temperature at a definable point in the intake area by means of a temperature sensor, the temperature can also be computed by means of an arithmetic unit from the measured values of one or more sensors located on the internal combustion engine and/or on the motor vehicle by means of a computational model. Advantageously the sensors which by design are present in an internal combustion engine with exhaust gas recirculation can be used for these measurements. Likewise the control device which by design is present in an internal combustion engine can be advantageously used for computing the temperature from the measured values delivered from the sensors. These measured values which have been detected by the sensors and delivered to the control device are for example the pressure and temperature of the gas mixture of the intake air and recirculated exhaust gas, the engine temperature, the outside temperature, the residual gas amount run at the operating point, the duration of the operating point, the driving speed of the motor vehicle, the engine speed and/or the engine load. The aforementioned computation can also take place without sensors if the parameters present in the control device permit such a temperature computation in the intake section of the internal combustion engine.

As already mentioned, it is especially advantageous to use an intake manifold of economical plastic.

For example, the inlet and/or the outlet camshaft can be used as actuators for fixing the amount of recirculated exhaust gas. As already mentioned at the beginning, the amount of recirculated exhaust gas is set by adjusting the inlet camshaft or outlet camshaft or the two camshafts which control the inlet and outlet valves. By adjusting the inlet or outlet camshaft, exhaust gas during the outlet stroke is first pushed back into the inlet channel and the intake manifold in order to then be intaken again in the following intake stroke.

Embodiments and advantageous configurations of the invention are described in the dependent claims.

The invention will now be detailed and explained using the embodiments shown in the figures.

Figure 2:
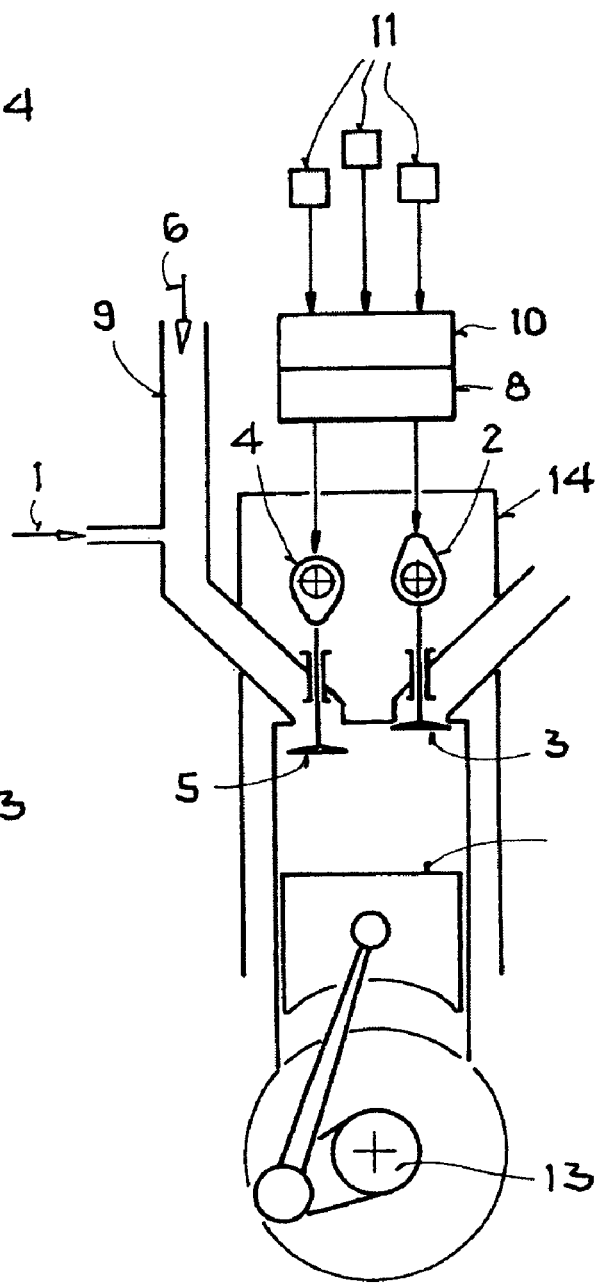

FIG. 1 shows a schematic diagram of a first exemplary embodiment of the invention and FIG. 2 shows a schematic diagram of a second exemplary embodiment of the invention.

FIG. 1 schematically shows a first exemplary embodiment of the invention.

FIG. 1 shows, of the internal combustion engine of a motor vehicle, the cylinder head 14, the inlet camshaft 4, the outlet camshaft 2, a piston 7, the crankshaft 13, and the intake manifold 9 in which at a definable point there is a temperature sensor 12. Exhaust gas 1 is fed into the intake manifold 9 which intakes fresh air 6.

The temperature sensor 12 delivers the measured temperature to a control means 8 which controls the amount of recirculated exhaust gas 1 by adjusting the inlet camshaft 4 or the outlet camshaft 2 or the two camshafts 2 and 4 such that the temperature at a definable point in the intake manifold 9 is adjusted as accurately as possible to the boundary temperature, especially a given maximum value. For each temperature prevailing at a definable point in the intake manifold 9, this measure as claimed in the invention effects the greatest possible exhaust gas recirculation to minimize fuel consumption and the boundary temperature is selected such that the material of the intake manifold 9 withstands the temperature. Plastic is preferably used as the material.

FIG. 2 shows a second embodiment of the invention in schematic form.

The second embodiment differs from the one shown in FIG. 1 in that instead of a temperature sensor in the intake manifold 9, there is at least one, preferably a plurality of sensors 11 which receive n measured values such as for example the pressure and the temperature of the gas mixture of intake air and recirculated exhaust gas, the engine temperature, the outside temperature, the residual gas amount run at the operating point, the duration of the operating point, the driving speed of the motor vehicle, the engine speed and/or the engine load.

An arithmetic unit, preferably a control device 10, as is ordinarily used in internal combustion engines with exhaust gas recirculation, computes from the n measured values delivered by the n sensors 11 by means of a computational model the temperature which prevails at the definable point in the intake manifold 9 and which is supplied to the control means 8 (instead of the measured temperature shown in FIG. 1). By adjusting the inlet camshaft 4 and/or the outlet camshaft 2, the control means 8 at this point, as in the first embodiment shown in FIG. 1, controls the amount of recirculated exhaust gas 1 such that at this point, instead of the measured temperature, the temperature computed by the control device 10 is adjusted as accurately as possible to the boundary temperature. The sole difference between the first and the second embodiment of the invention is that a computed actual value is supplied to the control means 8 as the actual value instead of the measured temperature.

The second embodiment is characterized by the advantage that the sensors which by design are present in an internal combustion engine with exhaust gas recirculation, that is, the n sensors 11, deliver measured values from which the control device 10 which by design is present in an internal combustion engine with exhaust gas recirculation, or a separate arithmetic unit, advantageously computes the temperature at the definable point in the intake manifold 9 by means of a computational model. Therefore an additional temperature sensor T is not necessary.

The invention may be used both for spark-ignition as well as for diesel engines. The invention can be used especially advantageously in motor vehicles for reducing exhaust gas emissions and fuel consumption without intake manifolds of expensive material being required.

REFERENCE NUMBER LIST 1 recirculated exhaust gas
2 outlet camshaft
3 outlet valve
4 inlet camshaft
5 inlet valve
6 fresh air
7 piston
8 control means
9 intake manifold
10 control device
11 sensor
12 temperature sensor
13 crankshaft
14 cylinder head

The invention claimed is:

1. A system for diminishing the thermal effects of the exhaust gas recirculation in an internal combustion chamber of a motor vehicle, comprising:
   means for sensing the temperature of said gas at a selected point along the flow thereof;
   means for comparing said sensed temperature with a selected temperature; and
   means for adjusting the supply of said gas responsive to a selected deviation of said sensed temperature from said selected temperature.

2. A system according to claim 1 wherein said means for sensing said temperature is operable to sense said temperature in said intake manifold.

3. A system according to claim 1 wherein said means for sensing said temperature is operable to sense said temperature in said intake manifold at a point where the temperature is maximum.

4. A system according to claim 1 including means for factoring at least one additional operating parameter of said vehicle into devising said adjustment.

5. A system according to claim 4 wherein said parameter is selected from a group consisting of the engine temperature, the exterior temperature, the driving speed, the engine speed, the engine load, the amount of residual gas at the operating temperature and the duration of maintaining the operating temperature.

6. A system according to claim 1 including means operatively connected to at least one of the intake camshaft, the outlet camshaft and a butterfly of said engine for effecting said adjustment.

7. A system according to claim 1 wherein the intake manifold of said engine is formed of a plastic material.

8. A method of diminishing the thermal effect of the exhaust gas recirculation in an internal combustion engine of a motor vehicle, comprising:

sensing a value of at least one of an operating condition of said vehicle selected from a group including the pressure of the gas mixture of the intake air and recirculated exhaust gas, the temperature of the gas mixture of the intake air and recirculated exhaust air, the engine temperature, the outside temperature, the residual gas amount run at an operating point, the duration of said operating point, the driving speed of the vehicle, the engine speed and the engine load;

computing a value of the temperature in the intake manifold from said sensed value by means of a model; and adjusting at least one of the inlet and outlet camshafts of the vehicle engine in response to said computed value.

9. A method of diminishing the thermal effect of the exhaust gas recirculation in an internal combustion engine of a motor vehicle, comprising:

sensing the temperature of said gas at a selected point, along the flow thereof;

comparing said sensed temperature with a selected temperature; and adjusting the supply of said gas responsive to a selected deviation of said sensed temperature from said selected temperature.

10. A method according to claim 9 wherein said temperature is sensed in the intake manifold of said engine.

11. A method according to claim 10 wherein said temperature is sensed in said intake manifold at a point where the temperature is maximum.

12. A method according to claim 9 wherein at least one additional operating parameter of said vehicle is factored into devising said adjustment.

13. A method according to claim 12 wherein said parameter is selected from a group consisting of the engine temperature, the exterior temperature, the driving speed, the engine speed, the engine lead, the amount of residual gas at the operating temperature and the duration of maintaining the operating temperature.

14. A method according to claim 9 wherein said adjustment is effected by operation at least one of the intake camshaft, the outlet camshaft and a butterfly valve of the engine.

* * * * *